(12) United States Patent
Sadot et al.

(10) Patent No.: US 6,222,964 B1
(45) Date of Patent: Apr. 24, 2001

(54) ULTRA-FAST TUNABLE OPTICAL FILTERS

(75) Inventors: Dan Sadot, Kfar Bilu; Daniel Majer, Givat Shmuel; Eyal Shekel, Jerusalem, all of (IL)

(73) Assignees: Ben-Gurion University of the Negev Research and Development Authority, Beer Sheva; Chiaro Networks Ltd., Jerusalem, both of (IL)

( * ) Notice: Subject to any disclaimer, the term of this patent is extended or adjusted under 35 U.S.C. 154(b) by 0 days.

(21) Appl. No.: 09/230,959

(22) PCT Filed: Aug. 3, 1997

(86) PCT No.: PCT/IL97/00264

§ 371 Date: Apr. 8, 1999

§ 102(e) Date: Apr. 8, 1999

(87) PCT Pub. No.: WO98/05995

PCT Pub. Date: Feb. 12, 1998

(30) Foreign Application Priority Data

Aug. 4, 1996 (IL) .......................................................... 119006

(51) Int. Cl.$^7$ ...................................................... G02B 6/26
(52) U.S. Cl. ................................................ 385/40; 385/32
(58) Field of Search ................................ 385/14, 15, 31, 385/32, 39, 48, 50, 129–132, 40

(56) References Cited

U.S. PATENT DOCUMENTS

| 4,146,297 | 3/1979 | Alferness et al. . |
|---|---|---|
| 4,461,535 | 7/1984 | Marcatali . |
| 4,685,763 | 8/1987 | Tada et al. . |
| 4,695,121 | * 9/1987 | Mahapatra et al. ..................... 385/40 |
| 4,750,801 | 6/1988 | Alferness . |
| 4,778,235 | 10/1988 | Fujiwara . |
| 4,794,617 | 12/1988 | Boeck . |
| 4,896,948 | 1/1990 | Dono . |
| 4,900,119 | 2/1990 | Hill . |
| 5,022,730 | 6/1991 | Cimini . |
| 5,073,004 | * 12/1991 | Clayton et al. ........................ 385/27 |
| 5,351,317 | 9/1994 | Weber . |
| 5,459,799 | 10/1995 | Weber . |
| 5,621,828 | 4/1997 | Baets et al. . |

FOREIGN PATENT DOCUMENTS

| 402135323 | * 5/1990 | (JP) . |
|---|---|---|
| 404332829 | * 11/1992 | (JP) . |
| 405181028 | * 7/1993 | (JP) . |

OTHER PUBLICATIONS

Chew et al., "An Optical Filter of Adjustable Finesse Using a Mach Zehnder Interferometer", Singapore ICCS/'94, IEEE, pp. 70–72.*

Kominato et al., "Silica–Based Finesse–Variable Ring Resonator", IEEE Photonics Technology Letters, vol. 5, No. 5, May 1993.*

Oda et al., "An Optical FDM Distribution Experiment Using a High Finesse Waveguide–Type Double Ring Resonator", IEEE Photonics Technology Letters, vol. 6, No. 8, Aug. 1994, pp. 1031–1033.*

Okamura et al., "A Finesse–Enhanced Er–Doped–Fiber Ring Resonator", Journal fo Lightwave Technology, vol. 9, No. 11, Nov. 1991, pp. 1554–1560.*

(List continued on next page.)

*Primary Examiner*—John D. Lee
*Assistant Examiner*—Michelle R. Connelly-Cushwa
(74) *Attorney, Agent, or Firm*—Arnall Golden & Gregory LLP

(57) ABSTRACT

An optical filter including at least one multiport optical coupler formed on a gallium arsenide substrate, one connection port of the at least one multiport optical coupler receiving an input optical signal, and another connection port of the at least one multiport optical coupler outputting a filtered optical signal and at least one electrically tunable optical resonator, formed on the gallium arsenide substrate and connected to at least one of the at least multiport optical coupler.

42 Claims, 10 Drawing Sheets

OTHER PUBLICATIONS

Burns, et al., "Waveguide Transitions and Junctions," in: *Guided Wave Optoelectronics*, (Tamir, ed.), pp. 89–144, Springer Verlag: 1990.

Carenco, et al., "Multiwavelight GaAs Rib Waveguide Directional Coupler Switch With 'Stepped $\Delta\beta$' Schottky Electrodes," *J. Appl. Phys.* 50(8):5139–5141 (1979).

Inoue, et al., "Switching Characteristics of GaAs Directional Optical Switches," *Applied Optics* 25(9):1484–1490 (1986).

Kominato, et al., Silica Based Finesse Variable Ring resonator,: *IEEE Photonics Technology Letters* 5(5): 560–562 (1993).

Mendoza–Alvarez, et al., "Analysis of Depletion Edge Translation Lightwave Modulators," *J. Lightwave Technology* 6(6):793–808 (1988).

Oda, et al., "An optical FDM Distribution Experiment Using a High Finesse Waveguide– Type Double Ring Resonator," *IEEE Photonics Technology Letters* 6(8): 1031–1033 (1994).

Vawter, et al., "Highly Accurate Etching of Ridge–Waveguide Directional Couplers Using in Situ Reflectance Monitoring and Periodic Multilayer," *Appl. Phy. Lett.* 62(1):1–3 (1993).

* cited by examiner

ULTRA-FAST TUNABLE OPTICAL FILTERS

FIELD OF THE INVENTION

The present invention relates to the field of tunable optical filters, especially for use in optical communications systems.

BACKGROUND OF THE INVENTION

High-speed data communications systems need to support the aggregate bandwidth requirements of current and future applications such as supercomputer interconnection, high-quality video conferencing, and multimedia traffic. It has long been clear that these bandwidth requirements can only be met by using optical transmission technologies. Many current approaches favor packet switching and ATM (asynchronous transfer mode) technology, due to their flexibility. The most promising candidate for the future hardware backbone for such networks is dense optical WDM (wavelength division multiplexing), a method of multiplexing a large number of optical data channels on a wavelength basis, i.e. each wavelength is regarded as a different channel, and is routed and manipulated separately from all other wavelengths.

Dense WDM needs advanced optoelectronic components and subsystems, capable of handling the extremely high aggregate bit rates and traffic levels demanded by modern optical data communications systems. One of the most critical components needed for implementation of WDM packet-switched systems is an ultra-fast tunable filter—a wavelength selective element in which the central wavelength of the selected bandpass can be tuned externally and dynamically at a very high rate.

Fast tunable filters are known and available commercially, but the tuning speed of all currently known types falls far short of the requirements of future and even of some current optical data transmission systems. The most common optical filters are based on classical interferometers, and include Fabry-Perot and Bragg filters. Such filters are tuned by mechanically moving the resonator structure, and the tuning speed is therefore comparatively slow—typically of the order of milliseconds, or, for the very fastest types, several tens of microseconds.

Another type of tunable filter is based on the Acousto-Optical effect. Such components depend on the interaction between an acoustic wave generated in the device, and the optical signal inputted to the component. Tunability is achieved by altering the frequency of the acoustic wave, which can be simply accomplished by altering the frequency of the electronic signal used to generate the acoustic wave. These filters are, however, polarization dependent, which causes many practical problems. Tuning speeds are reasonably high, of the order of microseconds.

Yet another tunable filter is based on a micromachined semiconductor structure, where the thickness of one of the parts of the structure is altered electrically. Here too, tuning speeds of the order of microseconds can be achieved.

The next generation packet-switched WDM networks are being designed for use with traffic throughputs of the order of Tbits/sec. Such systems therefore require switching and tuning speeds of the order of one nanosecond, and it is evident that even the fastest of the above mentioned filter technologies falls woefully short of these requirements, by about three orders of magnitude.

SUMMARY OF THE INVENTION

The present invention seeks to provide an improved high speed tunable optical filter which overcomes disadvantages and drawbacks of existing tunable optical filters, which provides tuning speeds of the order of one nanosecond, and which is capable of implementation as a low cost, high production volume monolithic component.

There is thus provided in accordance with a preferred embodiment of the invention, a tunable optical filter including at least one multiport optical coupler, to one connection port of which is inputted an optical signal, and from another one of which is outputted an optical signal to the end user, an optical transmission line of predetermined length configured as a resonator, with one of its ends connected to yet another one of the connection ports, and its other end connected to still another one of the connection ports, and with a phase modulator inserted in the above mentioned resonator such that the interaction of the phase modulated signal in the resonator with the input signal allows only signals of a preselected wavelength to be transmitted from the output port to the end user.

In accordance with another preferred embodiment of the invention, the output signal can be extracted from the resonator, by means of an additional coupler inserted into the resonator. In this case, the use of three-port couplers is sufficient.

In accordance with a further preferred embodiment of the invention, a filter with variable finesse can be provided by the use of couplers with variable power splitting ratios.

In accordance with yet another preferred embodiment of the invention, there is provided a compound resonator tunable optical filter including at least three multiport optical couplers, to one of the ports of the first coupler is inputted an optical signal, and from one of the ports of the last coupler is outputted a filtered optical signal to the end user, at least two optical resonators of predetermined length interconnecting the free ports of the couplers, and at least one phase modulator inserted in at least one of the above mentioned optical resonators, such that the interaction of the phase modulated signal with the input signal to the first coupler is operative to allow only signals of a preselected wavelength to be transmitted from the output port of the last coupler to the end user.

In applications where an electronic signal is required for the end use, the optical output signal of the filter may be converted into such a signal by means of a fast photodetector mounted on the output port. In applications where an optical signal is required for the end use, such as for optical spectrum analysis, the output optical data signal may be utilized directly.

In accordance with a further preferred embodiment of the invention, there is provided an optical filter including at least one multiport optical coupler, one connection port of the at least one multiport optical coupler receiving an input optical signal, and another connection port of the at least one multiport optical coupler outputting a filtered optical signal, and at least one tunable optical resonator connected to at least one of the at least one multiport optical coupler.

In accordance with vet another preferred embodiment of the invention, there is provided an optical filter as described above and wherein the at least one multiport optical coupler has at least first, second, third and fourth connection ports, the first connection port receiving an optical signal, the second connection port outputting a filtered optical signal and the at least one tunable optical resonator being connected across the third and fourth connection ports.

In accordance with still another preferred embodiment of the invention, there is provided an optical filter as described above and wherein the at least one multiport optical coupler consists of at least first and second optical couplers, each having at least first, second and third connection ports, the first connection port of the first optical coupler receives an optical signal, the second and third connection ports of the first optical coupler are coupled to the at least one tunable optical resonator, the first and second connection ports of the second optical coupler are coupled to the at least one tunable optical resonator, and the third connection port of the second optical coupler outputs a filtered optical signal.

In accordance with another preferred embodiment of the invention, there is provided an optical filter as described above and wherein the at least one tunable optical resonator is operative to select an optical signal with a specific wavelength or to enable the polarization of the filtered optical output signal to be selected.

In accordance with yet a further preferred embodiment of the invention, there is provided an optical filter with variable finesse consisting of an optical element with variable finesse receiving an optical signal and providing a filtered output, and a finesse controller operative to select the finesse of the variable finesse optical element. The variable finesse optical element of this embodiment could consist of an optical coupler with variable power splitting ratio between its connection ports.

In accordance with still another preferred embodiment of the invention, there is provided an optical filter with variable finesse consisting of at least one multiport optical coupler with variable power splitting ratio, one connection port of the at least one multiport optical coupler receiving an input optical signal, and another connection port of the at least one multiport optical coupler outputting a filtered optical signal, and at least one tunable optical resonator connected to at least one of the at least one multiport optical couplers.

There is provided in accordance with a further preferred embodiment of the invention, an optical filter with variable finesse wherein the at least one multiport optical coupler with variable power splitting ratio, has at least first, second, third and fourth connection ports, the first connection port receiving an optical signal, and the second connection port outputting a filtered optical signal, and the at least one tunable optical resonator being connected across the third and fourth connection ports.

In accordance with still another preferred embodiment of the invention, there is provided an optical filter with variable finesse wherein the at least one multiport optical coupler with variable power splitting ratio consists of at least first and second optical couplers, at least one of which has variable power splitting ratio, and each having at least first, second and third connection ports, the first connection port of the first optical coupler receives an optical signal, the second and third connection ports of the first optical coupler are coupled to the at least one tunable optical resonator, the first and second connection ports of the second optical coupler are coupled to the at least one tunable optical resonator, and the third connection port of the second optical coupler outputs a filtered optical signal.

In addition, there is provided in accordance with another preferred embodiment of the invention, an optical filter with variable finesse wherein the at least one tunable optical resonator is operative to select an optical signal with a specific wavelength, thereby providing tunability to both the wavelength and finesse of the optical filter, or enabling the polarization of the filtered optical output signal to be selected.

Additionally, there is provided in accordance with still another preferred embodiment of the invention, an integrated optical filter consisting of at least one multiport optical coupler, one connection port of the at least one multiport optical coupler receiving an input optical signal, and another connection port of the at least one multiport optical coupler outputting a filtered optical signal, and at least one optical resonator connected to at least one of the at least one multiport optical coupler, and wherein at least one of the at least one multiport optical coupler and the at least one optical resonator are formed on an integrated optical substrate.

In accordance with yet another preferred embodiment of the invention, there is provided an integrated optical filter wherein the at least one multiport optical coupler has at least first, second, third and fourth connection ports, the first connection port receiving an optical signal, the second connection port outputting a filtered optical signal, and the at least one optical resonator is connected across the third and fourth connection ports, and wherein at least one of the at least one multiport optical coupler and the at least one optical resonator arc formed on an integrated optical substrate.

Additionally, there is provided in accordance with a further preferred embodiment of the invention, an integrated optical filter wherein the at least one multiport optical coupler consists of at least first and second optical couplers, each having at least first, second and third connection ports, the first connection port of the first optical coupler receives an optical signal, the second and third connection ports of the first optical coupler are coupled to the at least one optical resonator, the first and second connection ports of the second optical coupler are coupled to the at least one optical resonator, and the third connection port of the second optical coupler outputs a filtered optical signal, and wherein at least one of the at least one multiport optical coupler and the at least one optical resonator are formed on an integrated optical substrate.

In addition, there is provided in accordance with other preferred embodiments of the invention, an integrated optical filter wherein the at least one optical resonator is a tunable optical resonator, or in which at least one of the at least one optical couplers and the at least one optical resonators includes a discrete non-integrated optical component.

In accordance with still another preferred embodiment of the invention, there is provided an optical filter of the compound resonator type, consisting of at least three optical couplers, each having at least three connection ports, and at least two optical resonators, at least one of which is tunable, each of the at least two optical resonators being connected between two of the at least three optical couplers, and wherein the first connection port of the first optical coupler receives an input optical signal, and the last connection port of the last optical coupler outputs a filtered optical signal.

Additionally, there is provided in accordance with a further preferred embodiment of the invention, an optical filter of the compound resonator type, consisting of at least first, second and third optical couplers each having at least first, second and third connection ports, and at least first and second optical resonators, at least one of which is tunable, each of the at least first and second optical resonators being connected between two of the at least first, second and third optical couplers, and wherein the first connection port of the first optical coupler receives an input optical signal, the second and third connection ports of the first optical coupler are coupled to the first of the at least first and second optical resonators, the first and second connection ports of the second optical coupler are coupled to the first of the at least first and second optical resonators, the third and fourth connection ports of the second optical coupler are coupled to the second of the at least first and second optical resonators, the first and second connection ports of the third optical coupler are coupled to the second of the at least first and second optical resonators, and the third connection port of the third optical coupler outputs a filtered optical signal.

In addition, there is provided in accordance with other preferred embodiments of the invention, an optical filter of the compound resonator type, as described in the previous two paragraphs and wherein the optical resonators consist of loops of optical transmission medium differing in length from each other by predetermined amounts, or wherein this difference in length is controlled by means of a piezoelectric transducer operative to stabilize the length.

In accordance with still another preferred embodiment of the invention, there is provided an optical filter, of the compound resonator type, as described in the previous paragraphs, and wherein at least one of the optical couplers or one of the optical resonators is formed on an integrated optics substrate.

In accordance with yet a further preferred embodiment of the invention, there is provided an integrated optical filter, of the compound resonator type, consisting of at least three optical couplers, at least one of which is formed on an integrated optics substrate, each of the at least three optical couplers having at least three connection ports, and at least two optical resonators, at least one of which is formed on an integrated optics substrate, each of the at least two optical resonators being connected between two of the at least three optical couplers, and wherein the first connection port of the first optical coupler receives an input optical signal, and the last connection port of the last optical coupler outputs a filtered optical signal.

There is further provided in accordance with yet another preferred embodiment of the invention, an integrated optical filter, of the compound resonator type, consisting of at least first, second and third optical couplers, at least one of which is formed on an integrated optics substrate, each of the at least first, second and third optical couplers having at least first, second and third connection ports, and at least first and second optical resonators, at least one of which is formed on an integrated optics substrate, each of the at least first and second optical resonators being connected between two of the at least first, second and third optical couplers, and wherein the first connection port of the first optical coupler receives an input optical signal, the second and third connection ports of the first optical coupler are coupled to the first of the at least first and second optical resonators, the first and second connection ports of the second optical coupler are coupled to the first of the at least first and second optical resonators, the third and fourth connection ports of the second optical coupler are coupled to the second of the at least first and second optical resonators, the first and second connection ports of the third optical coupler are coupled to the second of the at least first and second optical resonators, and the third connection port of the third optical coupler outputs a filtered optical signal.

Additionally, there is provided in accordance with a further preferred embodiment of the invention, an integrated optical filter of the compound resonator type wherein at least one of the optical resonators is tunable.

In accordance with another preferred embodiment of the invention, there is further provided an optical filter wherein the tunable optical resonator is tuned by altering the phase of an optical signal traversing through it by means of a phase modulator.

In addition, there is provided in accordance with yet another preferred embodiment of the invention, an optical filter whose filtered optical output is converted to an electronic signal by means of a photodetector.

There is additionally provided in accordance with yet another preferred embodiment of the invention, an active wavelength division multiplexing system including an optical filter as described in this invention, the filter being operative to select a desired wavelength of an optical signal.

When the tunable optical filter is implemented using bulk fiber optical components, a loop of fiber acts as the tuned resonator and a bulk electro-optical phase modulator is inserted in the loop to provide the variable phase delay which provides the resonator with its tunability. In order to miniaturize the filter to make it compatible with the other integrated opto-electronic components of an optical communications system, and in order to provide the very short loop lengths needed to meet the required specifications of the filter for dense WDM use, and in order to reduce the manufacturing costs of such a filter, the filter can also be implemented on a monolithic integrated optics chip, such as of gallium arsenide, with all of the component parts defined by means of standard semiconductor manufacturing techniques.

The operation of the filters is based on an interferometric interaction between the input optical signal and its delayed replica produced as a result of the signal traversing the resonator. When the input signal and the delayed signal are in phase at the output port of the last coupler, an output signal is obtained at a specific wavelength, and with the appropriate design, the device operates as an optical narrow bandpass filter. The output spectrum characteristics can he controlled by the phase delay introduced by the phase modulator, so that the device can perform dynamic interferometric processing of the optical signal, creating a dynamic tunable filter. Since optical phase modulation can be performed at exceedingly high rates, the result is an ultra-fast tunable wavelength selective filter. Current technology phase modulators are capable of operation in the 10 GHz range, so that tuning times of the order of one nanosecond are attained. The filter thus offers an attractive solution for the ultra-fast tuning speeds required in Tbit/sec packet-switched WDM networks.

BRIEF DESCRIPTION OF THE DRAWINGS

The present invention will be understood and appreciated more fully from the following detailed description, taken in conjunction with the drawings, in which:

FIG. 11A shows a schematic layout view of the circuit on the chip, whilst FIG. 11B is a cut-away cross section of the chip, showing the microelectronic structure of the chip.

FIG. 12A shows a schematic layout view of the circuit on the chip, whilst FIG. 12B is a cut-away cross section of the chip, showing the microelectronic structure of the chip.

DETAILED DESCRIPTION OF A PREFERRED EMBODIMENT

Figure 1:
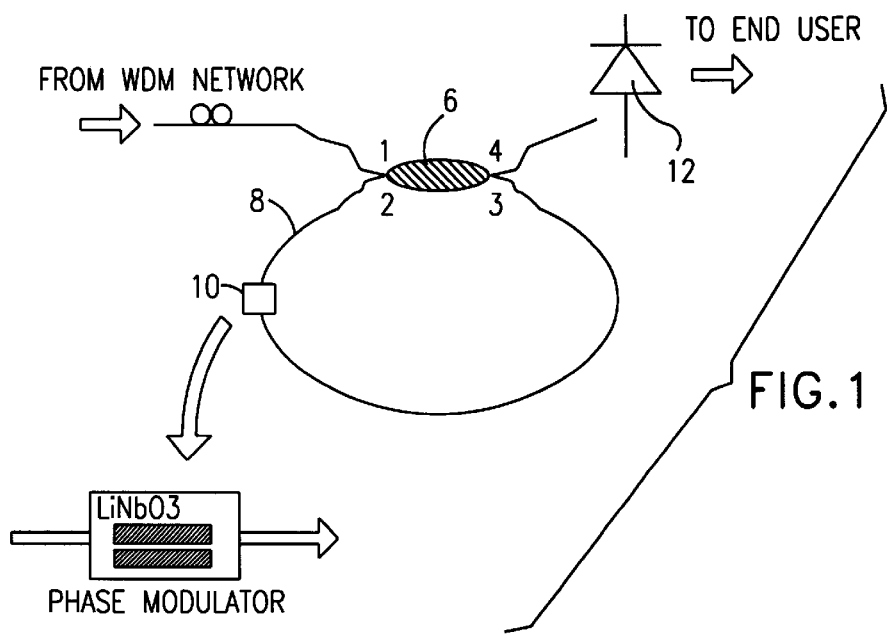
FIG. 1 is a schematic view of a single resonator tunable delay-line optical filter constructed and operated according to a preferred implementation of the present invention, showing a single optical coupler, a loop of optical transmission line with a phase modulator acting as a tuned resonator, and an optional photodetector for converting the outputted optical signal to an electronic signal if required.

Reference is now made to FIG. 1, which shows the construction and operation of a single resonator tunable delay line optical filter according to a preferred embodiment of the present invention. It comprises an optical coupler 6 with four ports labeled 1 to 4, a fiber loop 8, and an optical phase modulator 10. The fiber loop 8 is connected between ports 3 and 2 of the coupler 6, and thus interacts with the coupler as a resonant element. The optical coupler 6 is designed to optimize the filter performance in terms of transmitted power and filter finesse.

The optical signal is inputted through port 1, and the filtered signal is outputted through port 4. If an electronic data signal output is required for the end use application, such as for communications systems, the optical output signal is converted into an electronic data signal by means of photodetector 12. For optical signal output use, such as in an optical spectrum analyzer, the output signal is taken directly from port 4. The embodiment shown in FIG. 1 acts as a stop band filter, transmitting all wavelengths except that selected by the filter.

Figure 2:
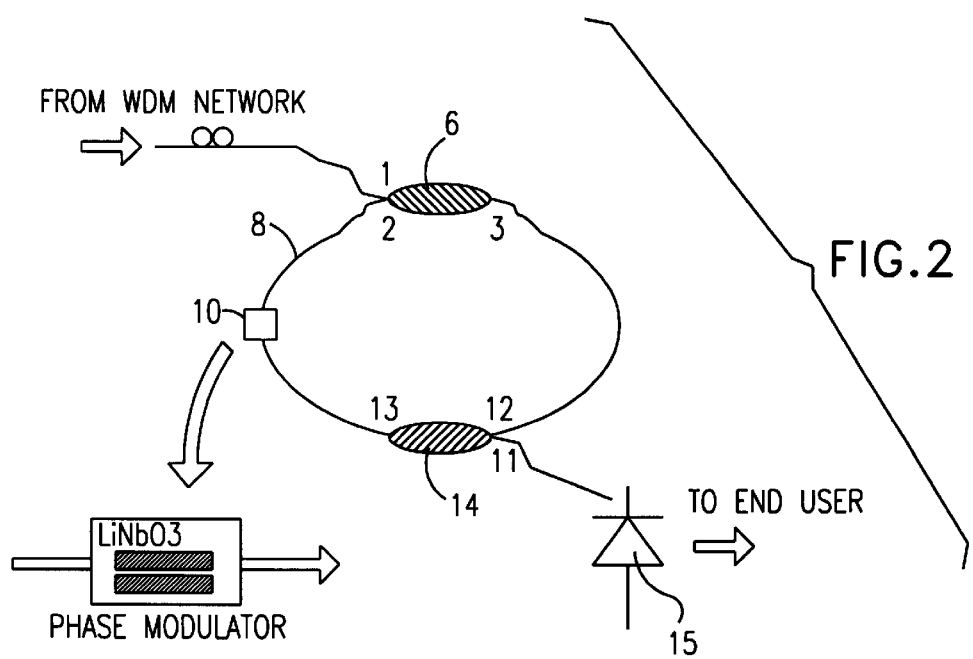
FIG. 2 is a schematic view of a single resonator tunable delay-line optical filter constructed and operated according to another preferred implementation of the present invention, which differs from the implementation shown in FIG. 1 in that an additional optical coupler is inserted into the resonator loop, and the filtered output optical signal extracted from the second coupler.

A further embodiment of the present invention is shown in FIG. 2, and operates as a pass band filter, transmitting only the wavelength selected by the filter. This embodiment differs from the embodiment shown in FIG. 1 in that the filtered output signal is extracted from the resonator by means of an additional optical coupler 14 inserted into the resonator loop 8. In this embodiment, use may be made of couplers having only 3 ports, 1, 2 and 3 for the input coupler 6, and 11, 12 and 13 for the output coupler 14. The fourth port of each of these couplers is terminated internally with a built-in absorber. The output signal is taken from port 11 of the output coupler 14, either as an optical output, or converted into an electronic signal by means of photodetector 15.

The performance of these filters can be calculated using Fabry-Perot resonator theory, as described in a number of standard works on Opto-electronics, such as for instance, in "Guided Wave Optoelectronics", Chapter 3, Springer Verlag, 1990. by T. Tamir. Using the nomenclature of the simplest embodiment shown in FIG. 1, it can be shown that the normalized light intensity $1_{filter}$ at the output port 4 is described by:

$$l_{filter} = \frac{(\sqrt{R} - e^{i\delta}) \cdot (\sqrt{R} - e^{-i\delta})}{(1 - t_{23})^2 + 4t_{23}\sin^2\left(\frac{\pi n L(\nu - \nu_0)}{c}\right)}, \quad (1)$$

where, $t_{23}$ is the complex transfer coefficient of the field amplitude from port 2 to port 3 of the coupler 6, $\delta$ is the total optical field phase delay after propagating through loop 8, R is the power reflection coefficient of the coupler 6, i.e. $|t^{23}|^2$ $\nu$ is the optical frequency, n is the refractive index of the optical medium constituting the loop 8, c is the speed of light, L is the loop length, and $\nu_0$ is the resonance frequency satisfying the condition:

$$\frac{2\pi\nu_0 n L}{c} = 2k\pi, \quad (2)$$

k being any integer.

The resulting frequency characteristic of the filter is a comb of narrow passband frequencies, one frequency for each value of k.

An important figure of merit for characterizing the wavelength selectivity of filters is the finesse. The finesse is defined as the ratio between the free spectral range (FSR), which is the frequency range between two resonance frequencies, and the full width half maximum (FWHM) of the filter:

$$Finesse = \frac{FSR}{FWHM}. \quad (3)$$

The free spectral range (FSR) is a function of the loop length, and is given by:

$$FSR = \frac{c}{nL}. \quad (4)$$

The phase modulator 10 inserted within the fiber loop is operative to control the phase delay of the signal traversing the fiber loop. This enables external control of the phase matching condition of the fiber loop resonator. A change of the phase matching condition leads to a frequency shift of the resonance frequency $v_0$, proportional to the phase shift imposed by the phase modulator. This mechanism essentially adds dynamic tuning capability to the filter. Currently available phase modulators, such as those based on LiNbO$_3$ technology, are capable of high-speed operation in the multi-GHz range. The filter according to the present invention can therefore be tuned in extremely short time periods, of the order of a nanosecond. This is approximately three orders of magnitude faster than other currently known filters.

The phase displacement $\Delta\delta$ imposed by the phase modulator causes a shift $\Delta v$ in the optical resonance frequency $v_0$, given by:

$$\Delta v = \frac{c\Delta\delta}{\pi nL} \quad (5)$$

so that the normalized light intensity $I_{filter}$ at the output port 4 of the phase tuned filter is described by equation (1), but with the term $v_0$ replaced by $v_0 + \Delta v$, as follows:

$$I_{filter} = \frac{(\sqrt{R}-e^{i\delta})\cdot(\sqrt{R}-e^{-i\delta})}{(1-t_{23})^2 + 4t_{23}\sin^2\left\{\pi nL\left[v-\left(v_0+\frac{c\Delta\delta}{\pi nL}\right)\right]/c\right\}}. \quad (6)$$

In order to design a filter for dense WDM applications, two important conditions must be fulfilled:

(1) the filter must reject all unselected channels within the WDM band, which is achieved by providing a sufficiently large free spectral range (FSR), and (2) the filter must minimize crosstalk from adjacent unselected channels, which is achieved by constructing the filter with a high finesse value design.

Although the single-resonator tunable filter, when constructed using practical lengths of optical fiber, performs well in terms of filter finesse (typically above 1250), its FSR is not satisfactory since only 20 GHz separates between two adjacent channels. A much more realistic requirement is an FSR of the order of 100 GHz, equivalent to about 0.8 nm, which is a candidate for the standard channel spacing in dense WDM systems. The filter FSR should be slightly larger than the channel spacing:

$$FSR=\Delta+FWHM, \quad (7)$$

where
$\Delta$ is the channel spacing of the WDM system, and
FWHM is the filter bandwidth.

Accordingly, all N channels adjacent to the selected one will be rejected, where $$N = \frac{FSR}{FWHM} - 2 = Finesse - 2 \cong Finesse. \quad (8)$$

Figure 3:
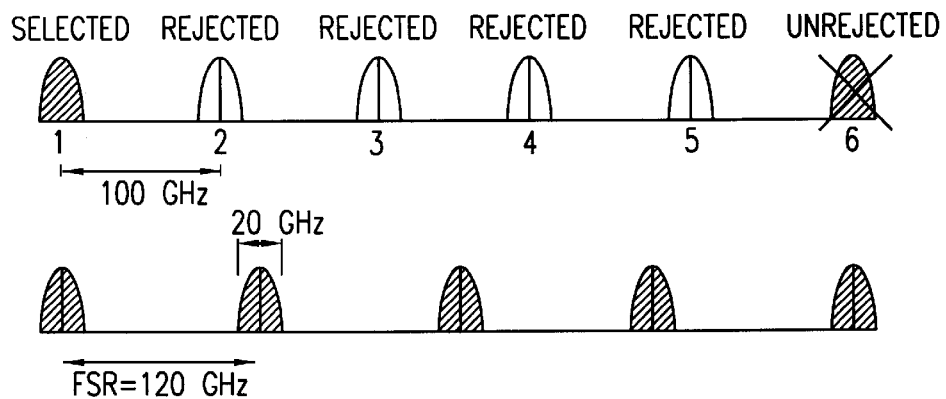
FIG. 3 is a representation of a 5-node WDM network frequency comb, with 100 GHz channel spacing, and 20 GHz channel bandwidth, and the frequency comb of a single resonator filter for use in that WDM system, constructed according to the present invention.

In the upper section of FIG. 3 is a representation of a typical 5-node WDM network frequency comb, with 100 GHz channel spacing and 20 GHz channel bandwidth, and in the lower section, the frequency comb of a single resonator filter constructed according to the present invention for use in that WDM system, and having an FSR of 120 GHz typically, and a 20 GHz FWHM bandwidth.

As illustrated in FIG. 3 and shown by equation (8), such a WDM system would be capable of supporting 5 channels at any given time—1 selected channel and 4 rejected channels.

However, because of the performance limitations of the currently available DFB and DBR semiconductor lasers used in optical data communications systems, and particularly because of the instability of the central wavelength, a more conservative design is required. Equation (7) should be amended to:

$$FSR=\Delta+k\cdot FWHM, \quad (9)$$

where k is a factor which depends on the variance of the central wavelength. Using this design, the number of nodes that the tunable filter can support becomes:

$$N \cong \frac{1}{k}\cdot Finesse \quad (10)$$

However, according to equation (4), in order to achieve an FSR of the order of 100 GHz with a single fiber loop, the required loop length is about 2 mm. This length is totally unrealistic for practical construction of single resonator filters using fiber optical loops. Two further embodiments of the present invention are thus proposed for providing practical solutions to this problem.

In the next section, an embodiment of the present invention using a compound-resonator structure implemented using optical fiber construction is proposed. The compound resonator filter design removes the severe loop length limitation mentioned above.

In a later section, a further embodiment of the present invention with a single resonator structure is proposed, but the loop length problem is overcome to a large extent by implementation of the filter on a microscopic scale on an integrated optics Gallium Arsenide substrate, using standard semiconductor manufacturing techniques.

Figure 4:
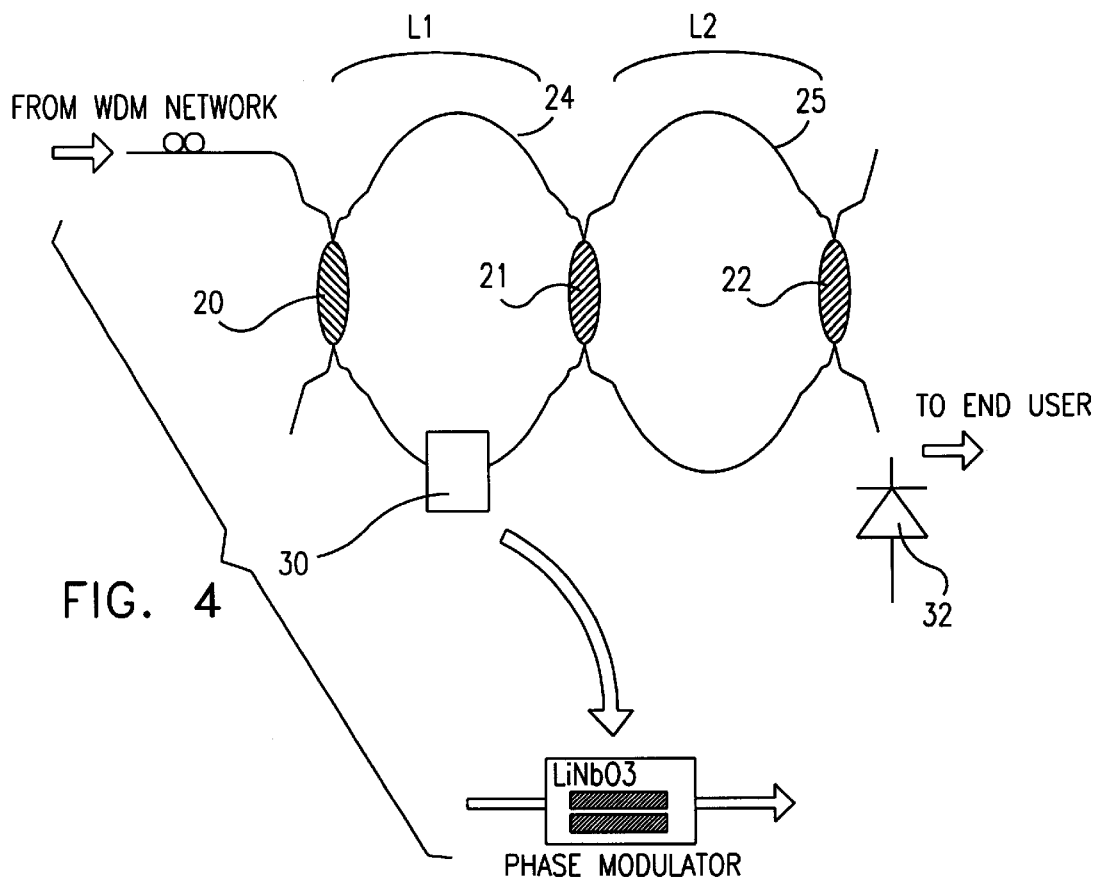
FIG. 4 is a schematic view of a compound resonator tunable delay-line optical filter constructed and operative according to another preferred embodiment of the present invention.

FIG. 4 shows a compound resonator tunable delay line optical filter constructed and operated according to another preferred embodiment of the present invention. It comprises three optical couplers 20, 21, 22, two fiber optical loops 24, 25, denoted by the terms L1 and L2, and an optical phase modulator 30. The optical signal is inputted through port 1 of the coupler 20, and the filtered signal is outputted through port 4 of coupler 22. As previously, if an electronic output signal is required, the optical signal is converted by means of photodetector 32. The three optical couplers need not be identical, and can be selected to optimize the filter performance in terms of transmitted power and filter finesse. It can be shown that the compound filter has the following transfer function:

$$E_{out} = E_{in} \cdot \frac{t_1 t_2 t_3 \exp[-i\beta(L_1+L_2)]}{\left\{1 - r_1 r_2 \exp(-2i\beta L_1) - r_1 r_3 t_2^2 \frac{\exp[-2i\beta(L_1+L_2)]}{1-r_2 r_3 \exp(-2i\beta L_2)}\right\}[1-r_2 r_3 \exp(-2i\beta L_2)]} \quad (11)$$

where
$L_1$ and $L_2$ are the single-pass lengths of each resonator loop,
$\beta$ is the propagation constant in the fiber, $t_i$ and $r_i$ are the field amplitude transmission and reflection coefficients of optical coupler i, respectively, and are defined by:

$$t_i=t_{13}=t_{24} \; r_i=t_{14}=t_{23}, \quad (12)$$

where $t_{ij}$ is the complex transfer coefficient from port i to port j of the coupler.

The compound resonator filter has much more design flexibility, due to the additional loop resonator, and the additional independent transmission and reflection coefficients of the additional optical couplers. This allows the construction of filters with a wide selection range of FSR, FWHM, and filter finesse. In particular, it is feasible and practical to realize a filter with FSR in the order of hundreds of GHz, i.e., a few nm, as required for dense WDM applications in optical communications.

Figure 5:
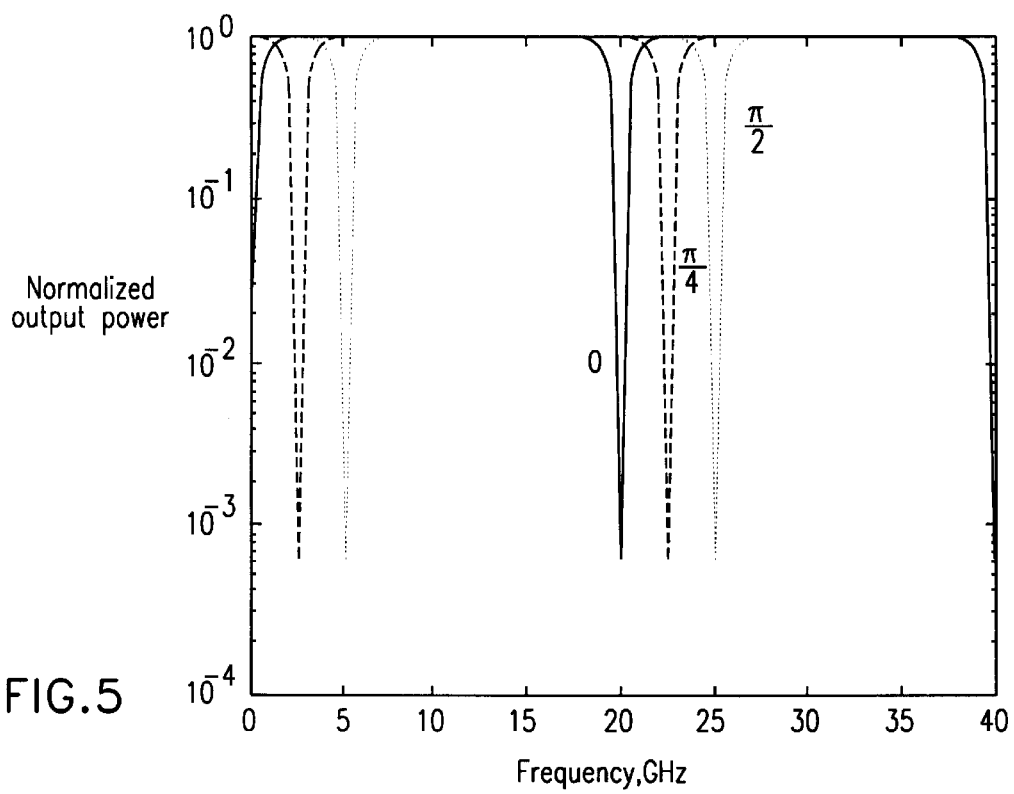
FIG. 5 shows frequency response transmission plots for a single resonator tunable filter, constructed and operated according to a preferred embodiment of the present invention.

FIG. 5 shows transmission plots for a single-resonator tunable filter, constructed and operated according to a preferred embodiment of the present invention, with a loop 8 of length 1 cm, and a coupler 6 with power splitting ratio of 10/90. The curves were calculated from equation (1). The different curves, plotted for phase shifts of 0, π/4 and π/2, show the level of tunability achievable in such a filter using phase modulation. In this example, the filter finesse exceeds 125.

Figure 6:
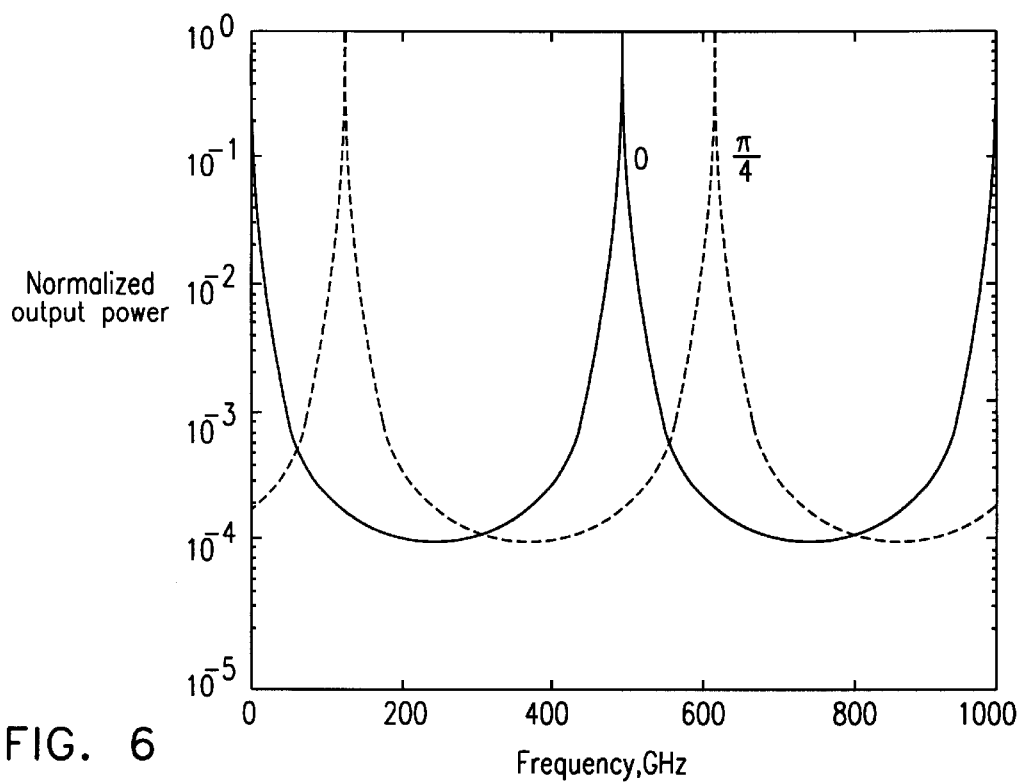
FIG. 6 presents theoretical frequency response transmission plots for the compound resonator tunable filter shown schematically in FIG. 3, illustrating the advantages of the compound resonator filter over the single resonator filter.

FIG. 6 presents theoretical frequency response transmission plots for the compound resonator tunable filter shown schematically in FIG. 4. The compound resonator configuration has major advantages over the single resonator design. Most important is that the FSR can be extended to the range of hundreds of Ghz (a few nm.) and more. This is achieved using an appropriate design of the two fiber loop resonators L1 and L2, 24 and 25, with a very slight length difference between them, of the order of fractions of a mm. This length difference can be accurately controlled with a PZT (piezo-electric transducer).

A further important advantage of the compound resonator is the large sidemode rejection ratio, which is significantly increased in comparison with the single resonator filter. While the single resonator filter exhibits 10 dB sidelobe suppression, that of the compound resonator filter whose results are shown in FIG. 6 exceeds 40 dB.

Furthermore, the filter finesse can be designed more flexibly, since there are more independent coupler reflection and transmission parameters to use for optimization of the desired finesse. The filter of FIG. 6 has a finesse of over 1000. This filter is constructed with a fiber loop length of 20 cm, and a loop length difference of 0.1 mm. The input coupler 20 has a power splitting ratio of 2/98, the intermediate coupler 21, a ratio of 1/99, and the output coupler 22, a ratio of 10/99.

Figure 7:
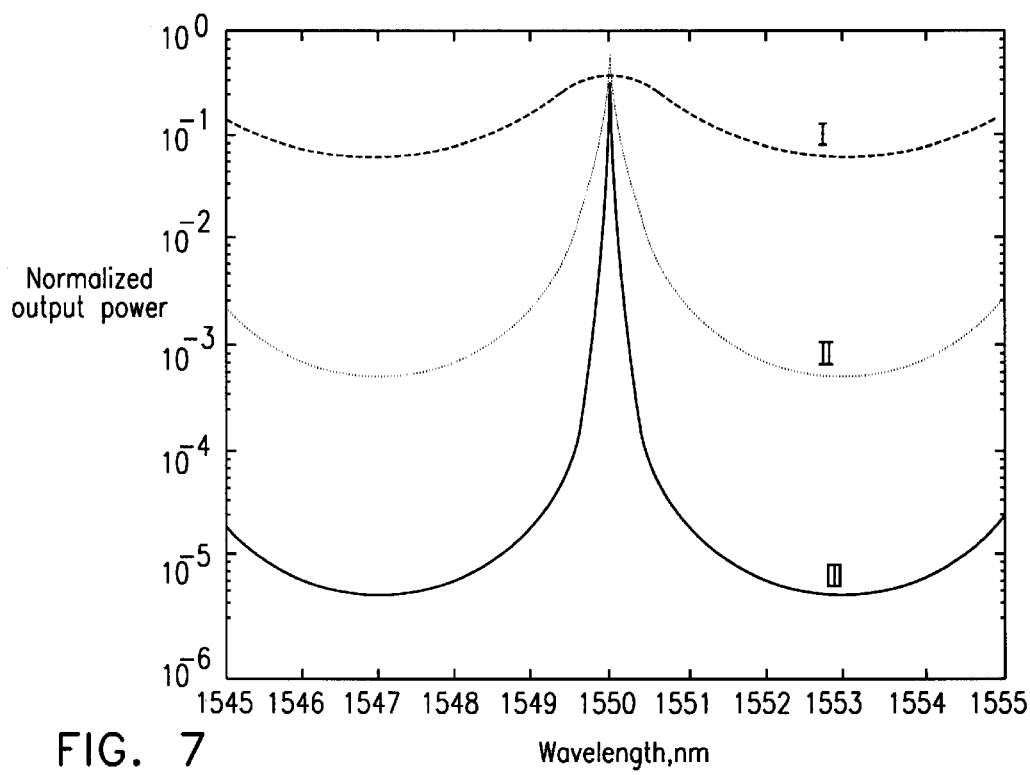
FIG. 7 shows the frequency response transmission plots for three compound resonator filters constructed with different couplers, illustrating the variation in filter finesse attainable thereby.

FIG. 7 shows the frequency response transmission plots for three compound resonator filters constructed using couplers with different power splitting ratios, illustrating the variation in filter finesse attainable thereby. Response curve I is obtained from a compound resonator filter with coupler splitting ratios of 20/80, 8/92 and 10/90 for the input, intermediate and output couplers respectively, and the resulting filter has a finesse of about 25. Response curve II has couplers of splitting ratios 10/90, 1/99 and 10/90 respectively, resulting in a finesse of the order of 250. Response curve III has couplers of splitting ratios 1/99, 0.1/99.9 and 10/90 respectively, and the filter a finesse of 1000.

The ability to select the filter finesse is an important feature of the compound resonator filter, since different optical communications systems require different wavelength selective curves to optimize system performance. One important consideration in filter design consideration is the wavelength stability of the transmitter laser used in the system. If the wavelength stability of the laser is such that there could arise significant wavelength misalignment between the laser frequency and the filter mid-band frequency, then a filter with lower finesse is required to compensate for this misalignment.

Figure 8:
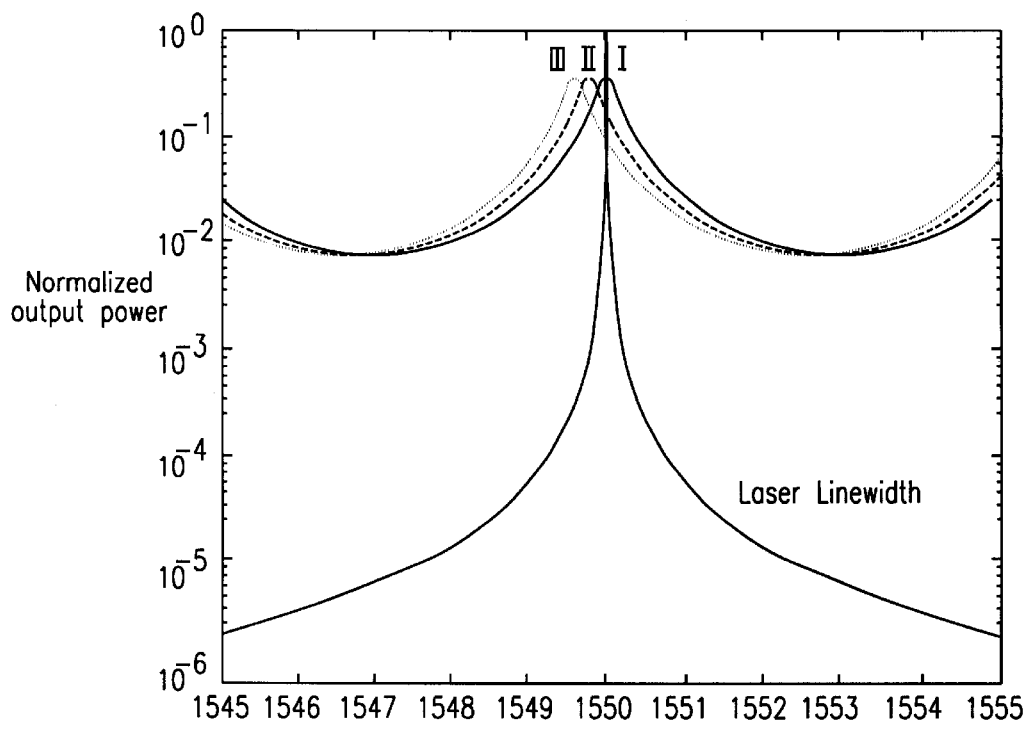
FIG. 8 shows a computer simulation of frequency response transmission plots for three cases of wavelength misalignment between the transmitter laser and a compound resonator tunable filter used in the receiver of an optical communication link.

FIG. 8 shows a computer simulation of frequency response transmission plots for three cases of wavelength misalignment between the transmitter laser and the filter at the receiver of an IM/DD (intensity-modulation/direct-detection) optical communication link. The laser spectrum chosen was one with a Lorenzian lineshape and a bandwidth of 1 GHz, which would represent the modulation of a datastream running at 1 Gbit/sec. The spectral response curves of the filter are generated from equation (11), while the filter finesse is 25. The three different curves represent the following cases: a perfectly aligned case (curve I), a 15 GHz wavelength misalignment (curve II) and a 30 GHz wavelength misalignment (curve III). As is evident, when the wavelength misalignment is large (15 or 30 GHz), a filter of low finesse is essential to compensate for the misalignment.

Figure 9:
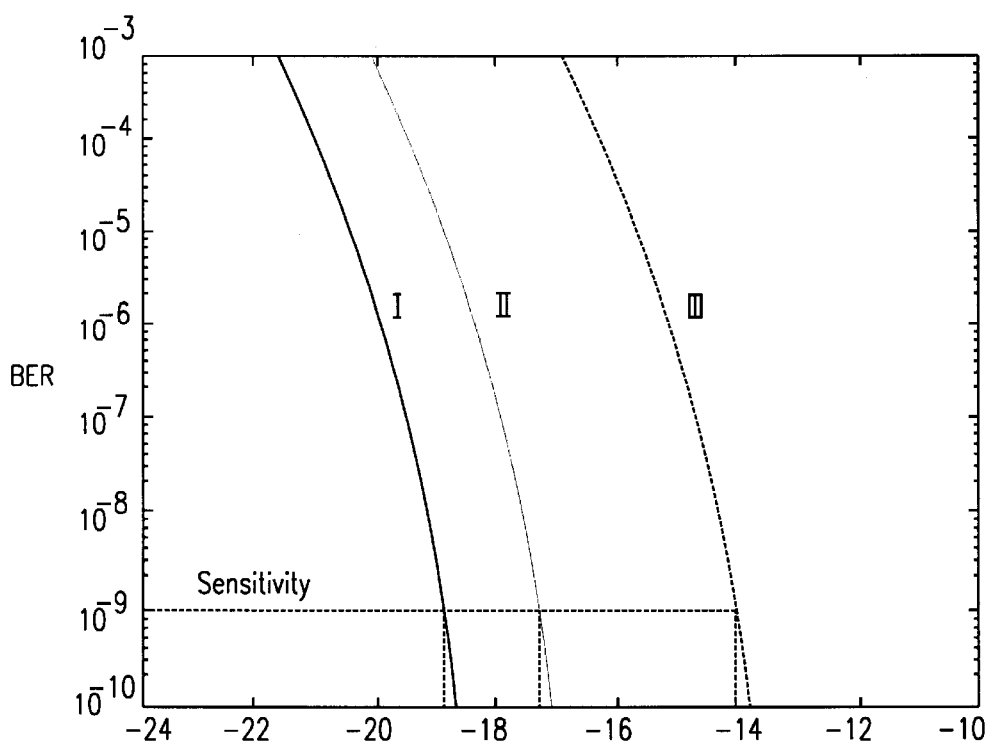
FIG. 9 presents plots of the BER (bit error rate) of the optical communication system with the three wavelength misalignment cases described in FIG. 8.

FIG. 9 presents plots of the BER (bit error rate) of an IM/DD optical communication system with the three wavelength misalignment cases described in FIG. 8. The filter itself uses couplers with power splitting ratios of 50/50, 1/99 and 10/90, and has a finesse of 25. It uses a PIN photodiode for detection, and the whole system has an NEP of 30 pW/√Hz, and a responsistivity of 4. The transmission bit rate is 1.25 Gbit/sec. It is observed that for a system with a perfectly aligned laser, as shown by curve I, the receiver sensitivity, defined at a BER of $10^{-9}$, is −18.5 dBm. The same system using a laser with wavelength misalignment of 15 Ghz, as shown in curve II, suffers a power penalty of about 2 dBm, while a 30 GHz misalignment, as shown in curve III, produces a loss of about 7.5 dBm compared with the perfectly aligned case. These noise figures are obtained with a filter of relatively low finesse, 25, specifically selected to compensate for the laser misalignment. If a narrower band filter with higher finesse were used, the power penalty with wavelength misalignment becomes much higher.

On the other hand, the use of a filter with a very low finesse increases the power penalty as a result of crosstalk between adjacent channels. Therefore, an optimization procedure must be followed to minimize the power penalties derived from both wavelength misalignment and channel crosstalk.

Figure 10:
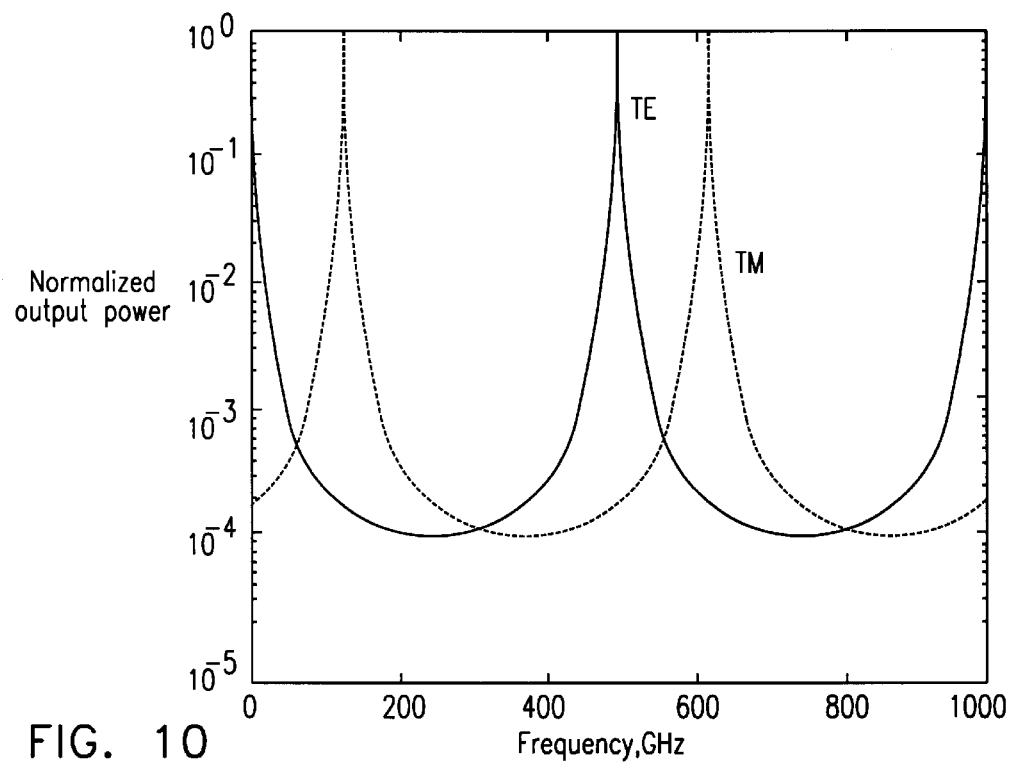
FIG. 10 shows a graph of the optical transmission as a function of the tuning of a single resonator tunable filter, constructed and operated according to a preferred embodiment of the present invention, for signals of different optical polarization.

Because of birefringence in the active optical medium in the phase modulator, transmission of the TE and TM polarization components of the output of the filter will change with the wavelength to which the filter is tuned. This effect allows yet a further embodiment of the present invention, whereby the filter acts as a polarization selector for separating TE and TM components of a mixed polarization signal. In this embodiment, an additional polarizer must be used in the output or input line to remove the polarization component not required. FIG. 10 is a graph of the optical transmission as a function of the tuning of the compound resonator tunable filter of FIG. 6., which illustrates how a filter constructed and operative according to a preferred embodiment of the present invention, can perform polarization selection.

All of the above described implementations of the present invention, using optical fibers, are comparatively expensive to manufacture, since each component part has to be assembled in the filter and fine tuned individually. Furthermore, the use of the bulk fiber configuration results in a bulky component package.

Both of these disadvantage can be overcome by means of a further embodiment of the present invention, whereby the filter is implemented by monolithic integration on a single opto-electronic chip, as used in integrated optics technology. The main advantage of this integrated chip implementation is commercial, since production using standard semiconductor industry technology enables the filters to be manufactured at lower cost, more reproducibly and with higher reliability. Such mass production is essential to allow the proliferation of WDM-based optical data communication systems.

However, besides the commercial advantages, the integrated optics monolithic implementation also has a number of technological advantages. Firstly, the optical loop resonator length can be made significantly smaller, down to the order of a millimeter or less. As a result, the resonance build-up time is considerably shorter, thus increasing the filter tuning speed. More important, the filter free spectral range (FSR) can be increased by an order of magnitude, up to the order of a hundred GHz. This is sufficient for current WDM systems using a small number of laser sources, with 10 GHz bandwidth typically. In order to achieve a monolithic filter with an FSR of 5 Thz., as demanded by the requirements of the currently proposed WDM networks, which will be required to cover the whole EDFA (Erbium Doped Fiber-Optical Amplifiers) bandwidth, a more advanced configuration must be used, such as the compound resonator filter described previously.

If the monolithic embodiment is constructed without incorporating a phase modulation element, a fixed wavelength monolithic filter is obtained, which can be constructed with selected center wavelength and finesse according to the parameters and dimensions chosen. Because of its small size and superior properties, such filters are useful for static switched WDM optical communication system applications.

In addition, the losses within the device can be decreased. The fiber loop configuration includes connections to an external phase modulator, which introduces losses of an additional pair of connectors (about 0.2 dB each). The integrated optics configuration incorporates the phase modulator on the same chip. Therefore, losses are reduced because of the reduction in the use of one set of connectors.

Furthermore, temperature dependence can be overcome quite simply, since the whole device is integrated on a very small chip., which can be kept at fixed temperature by means of simple and inexpensive control methods.

Finally, the monolithic design leads to a very small device, of size similar to that of semiconductor lasers and suitable for integration with other OEIC (Optoelectronic integrated circuit) components into complete integrated optics communications systems.

Figure 11A:
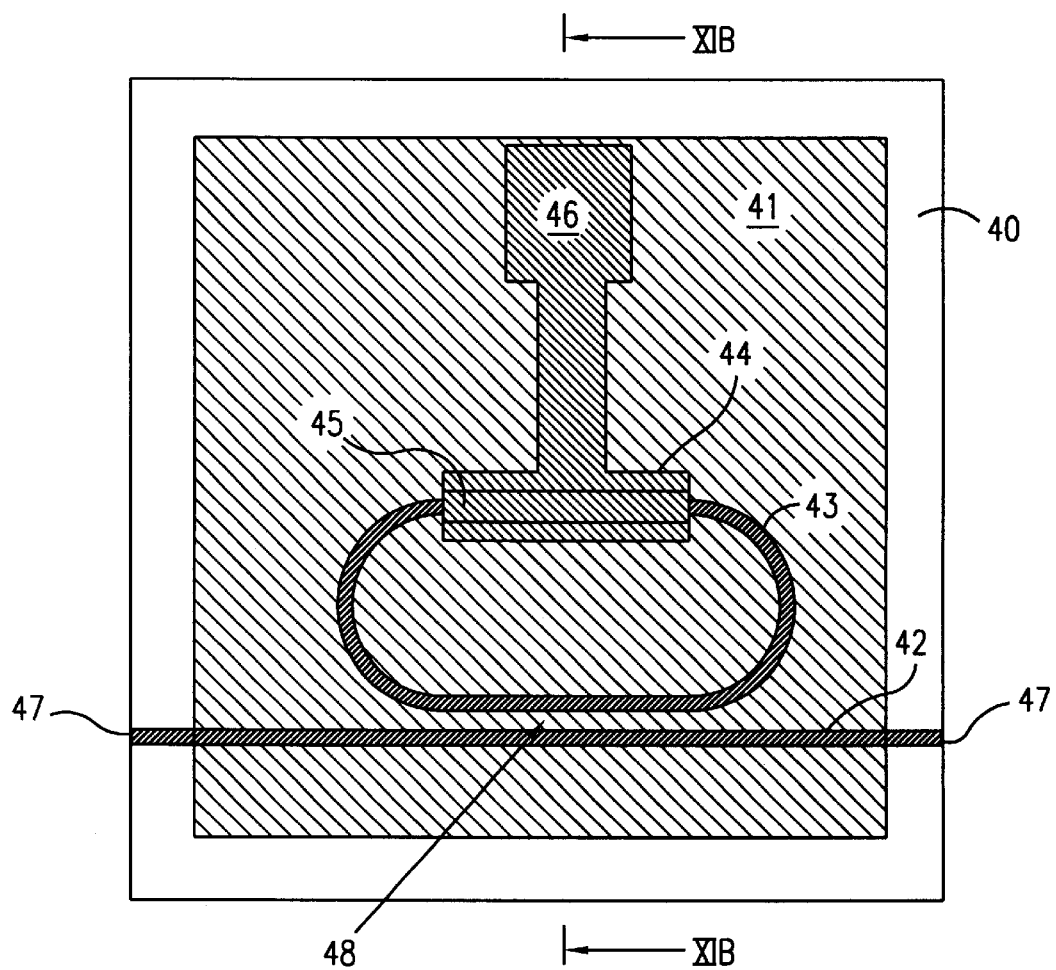
FIGS. 11A and 11B show an additional embodiment of the present invention, in the form of a single resonator tunable delay line optical filter implemented on a monolithic integrated optics substrate of gallium arsenide.
Figure 11B:
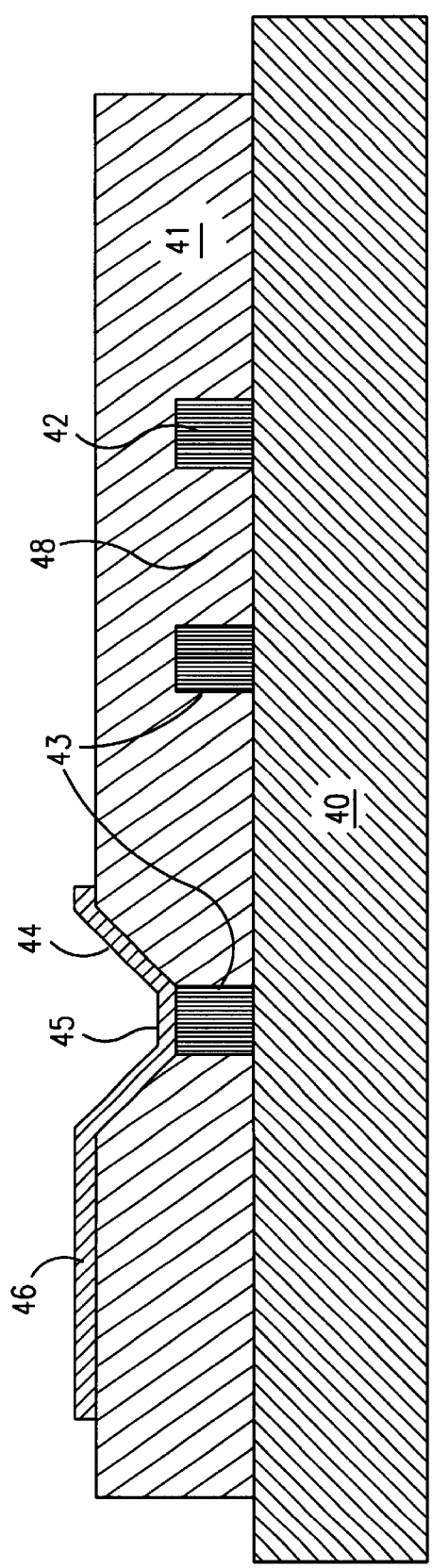

FIGS. 11A and 11B show a schematic view of an additional embodiment of the present invention, in the form of a single resonator tunable delay line optical filter implemented on a monolithic integrated optics substrate of gallium arsenide. Any other suitable integrated optics substrate material could also be used. FIG. 11A is a plan view of the chip layout, while FIG. 11B is a cut-away cross section of the chip showing the microelectronic structure of the chip. The filter is manufactured on an MBE (molecular beam epitaxy) grown n-type GaAs wafer 40. Using standard photolithographic techniques, a mesa is defined and etched by RIE (reactive ion etching,). The mesa defines the waveguide 42, and the resonator loop 43 of the optical structure of the filter. These waveguides are defined using one of the standard cladding/core/cladding, waveguiding structures used in integrated optics GaAs technology. A metal gate 44 over part of the resonator loop, and its associated bond pad 46, are defined by a further process. The device is covered with an insulating layer 41 such as polyimide to passivate the device, and to insulate the gate 46 from the wafer. A via 45 in the polyimide layer facilitates the gate-to-resonator loop contact area. An Ohmic contact is evaporated onto the back of the wafer, and is allowed in. Finally, the substrate is cleaved to create cleaved edge facets 47 for interface to the input and output optical signals.

The gate 44 located above a section of the resonator loop together with the section of the loop itself, act as a phase modulation element. The signal applied to the gate creates an electric field across that section of the resonator loop, causing a change in the waveguide refractive index by means of a physical effect, such as the linear electro-optic effect. The change in refractive index introduces a phase change in the optical signal propagating in the resonator loop, analogous to that introduced by the Lithium Niobate phase modulator 10 of the fiber optical implementation shown in FIG. 1. If this gate is omitted, a static monolithic filter is obtained. The coupling between the through-waveguide 42 and the resonator loop 43 takes place across the gap 48, whose width and length are calculated to provide the correct power splitting ratio for the designed filter operation.

Figure 12A:
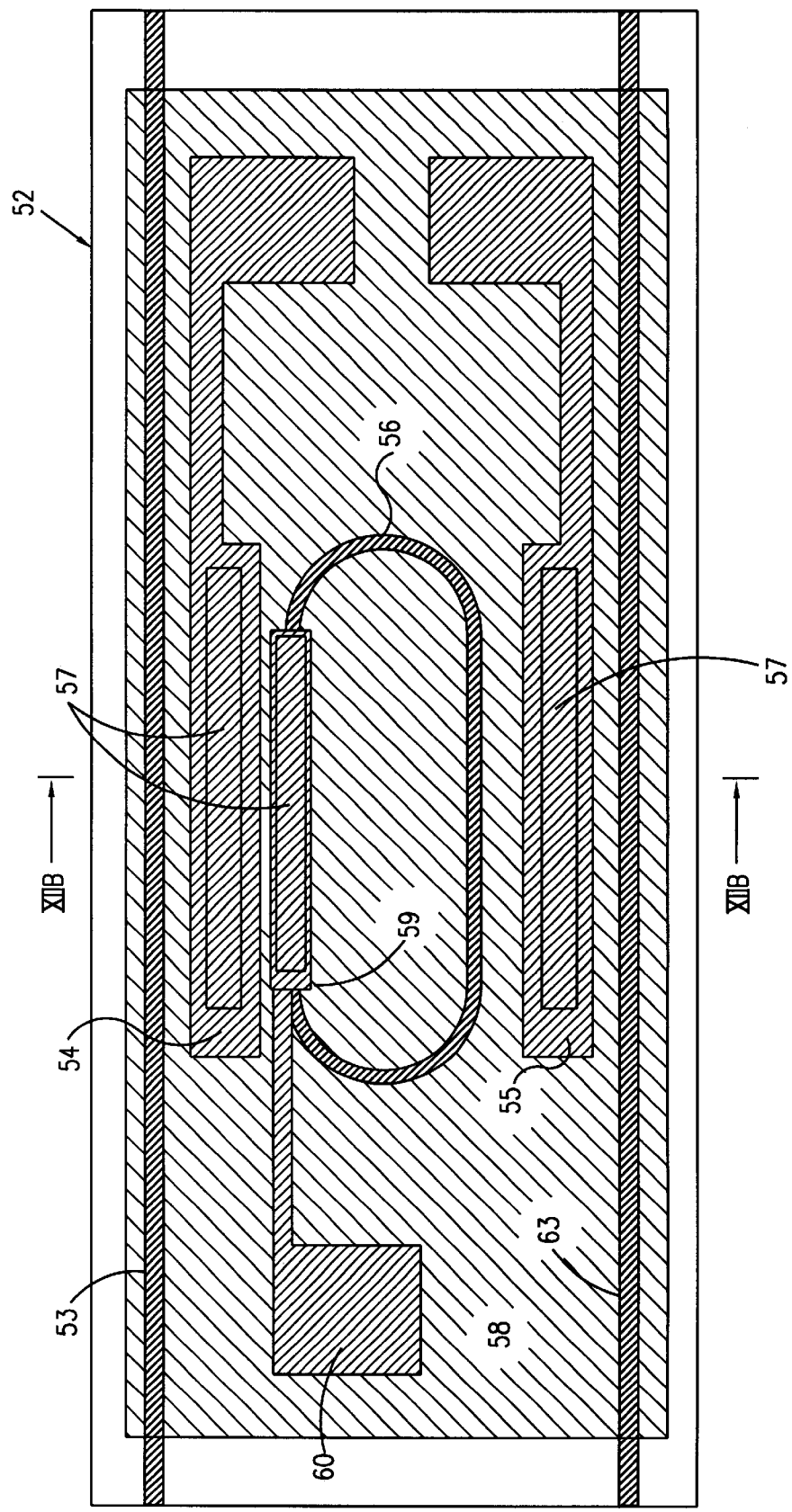
FIGS. 12A and 12B illustrate a more advanced embodiment of the monolithic optical filter, including three couplers and three gates, for providing dynamic control both of the filter center frequency, and of the filter finesse value.
Figure 12B:
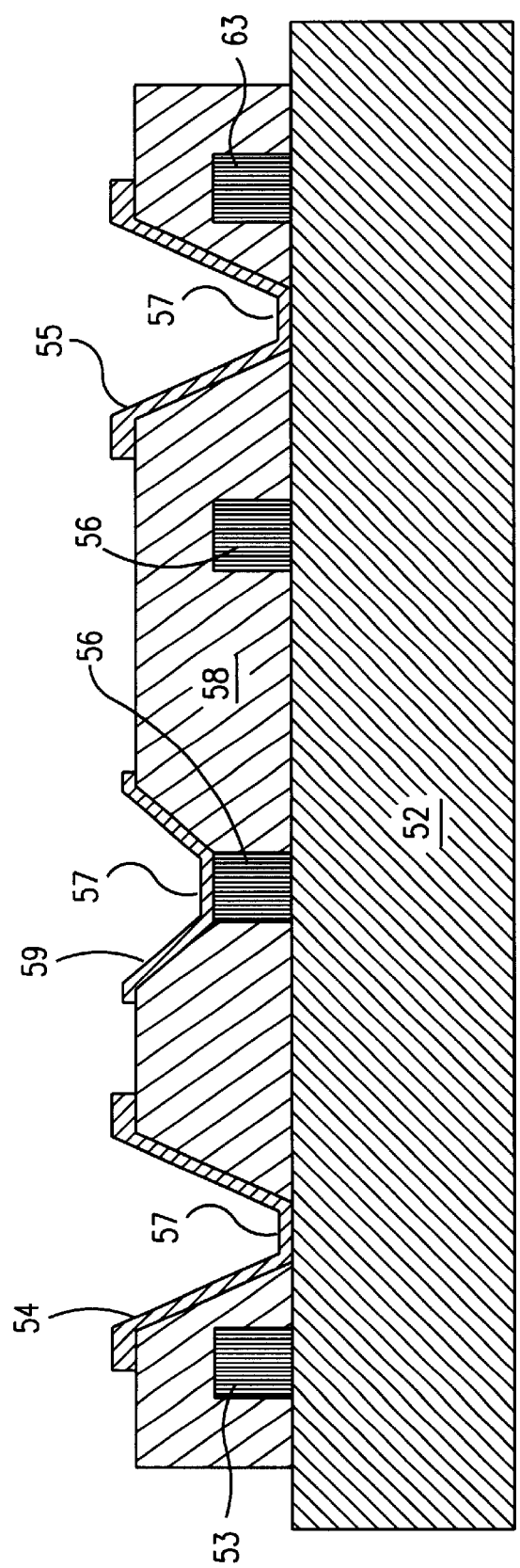

FIGS. 12A and 12B illustrate a schematic view of a more advanced embodiment of the monolithic optical filter. FIG. 12A is a plan view of the chip layout, while FIG. 12B is a cut-away cross section of the chip showing the microelectronic structure of the chip. This construction comprises a GaAs wafer 52 on which are defined a first waveguide 53, and a second waveguide 63, with a resonator loop 56 disposed between them. A first metal gate 59 is located above a section of the resonator loop, and two further gates 54 and 55 are located between each waveguide and the resonator loop. Before deposition of the metallic gates, the whole GaAs structure is covered with an insulating layer 58 such as polyimide, containing vias 57 to provide contact between these three gates and the underlying GaAs layer. The manufacturing technique is similar to that of the simpler embodiment filter shown in FIGS. 11A and 11B.

This advanced embodiment acts as a bandpass filter, by selecting, from the range of wavelengths inputted to the first waveguide 53, the specific wavelength to be switched to the second waveguide 63, by means of the resonance loop 56. The first gate 59 together with the section of resonator loop under it operate as a phase modulator for tuning the filter passband. As in the embodiment of FIGS. 11A and 11B, if this embodiment is constructed without the phase modulator gate 59, a static filter is obtained.

The two other gates 54 and 55 are operative to change the coupling between the first waveguide and the resonator loop, and between the resonator loop and the second waveguide as a function of the voltage applied to them. In this way, the filter finesse can be changed dynamically by means of the control signals applied to gates 54 and 55.

Figure 13:
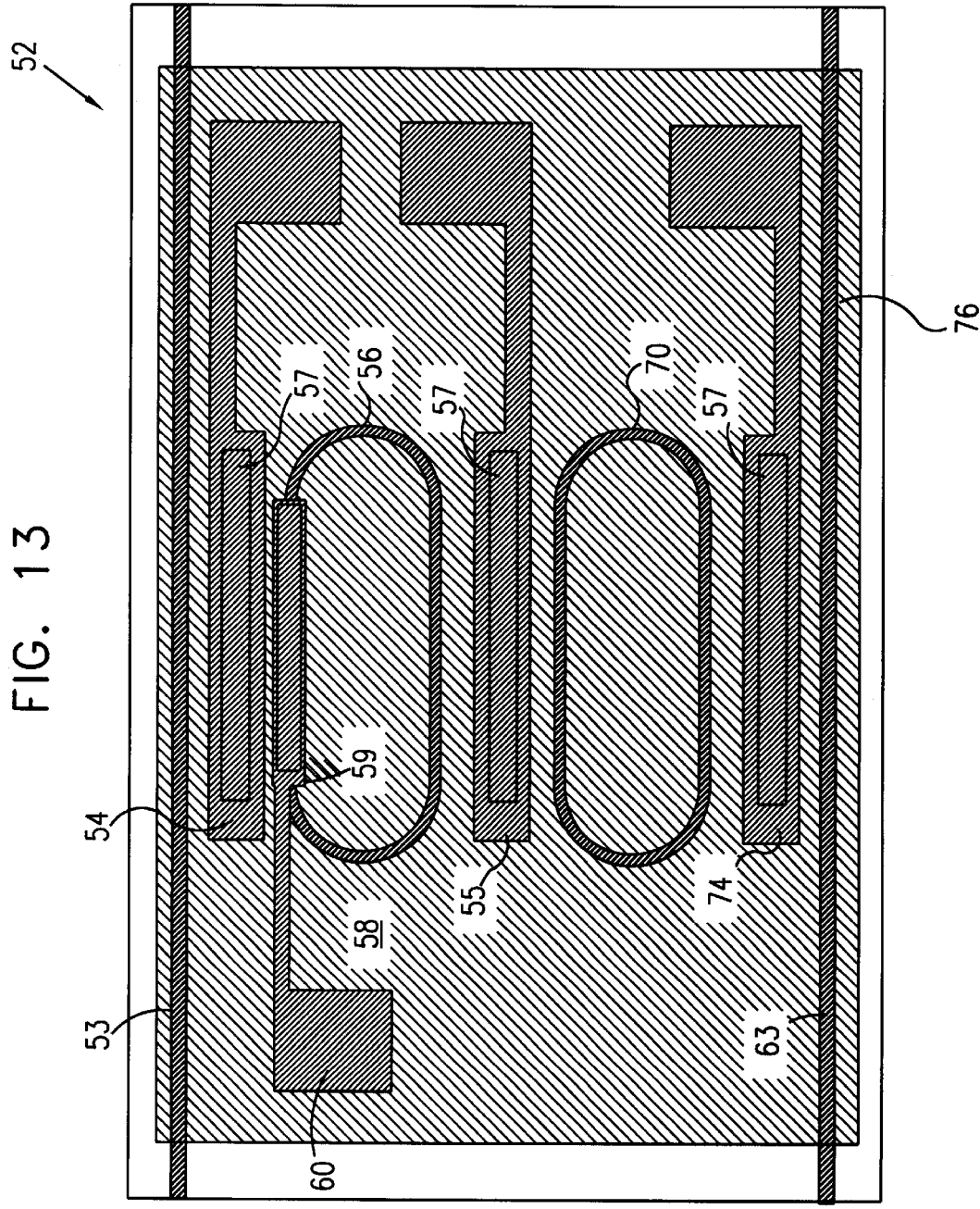
FIG. 13 shows an additional embodiment of the present invention, in the form of a compound resonator tunable delay line optical filter implemented on a monolithic integrated optics substrate of gallium arsenide.

FIG. 13 shows a schematic layout view of a compound resonator monolithic tunable filter constructed and operated according to another preferred embodiment of the present invention, analogous to the fiber optical implementation described in FIG. 4. Use of the compound resonator monolithic embodiment enables filters with an FSR of up to 5 Thz to be constructed, for use in the next generation WDM system technology.

The embodiment shown in FIG. 13 is constructed on a substrate 52 of Gallium Arsenide, and has a passivating layer 58 of polyimide, as in the previously described monolithic embodiments. It has two resonator loops 56, 70, and a variable phase modulator gate 59 acting on one of the loops 56. The phase change is varied by means of a voltage applied to pad 60. This embodiment of the filter can also be constructed in a fixed wavelength form, in which case the gate 59 and pad 60 are not fabricated. The coupling between the two resonators can be varied by means of gate 55. Gate 54 varies the coupling between the input line 53 and the first resonator 56, and gate 74, the coupling between the second resonator 70 and the output port 76. In this way, the filter finesse can be changed dynamically by means of control signals applied to gates 54, 55 and 74. The optical signal is inputted through line 53, and the filtered signal outputted through line 63 to the output port 76.

Some of the component parts of the monolithic implementations described in FIGS. 10, 11 and 12 may be implemented as discrete non-integrated components, if such hybrid construction is necessary, convenient or economical for the specific application required.

It will be appreciated by persons skilled in the art that the present invention is not limited by what has been particularly shown and described hereinabove. Rather the scope of the present invention includes both combinations and subcombinations of various features described hereinabove as well as variations and modifications thereto which would occur to a person of skill in the art upon reading the above description and which are not in the prior art.

We claim:

1. An optical filter comprising:
    at least one multiport optical coupler formed on a gallium arsenide substrate, one connection port of said at least one multiport optical coupler receiving an input optical signal, and another connection port of said at least one multiport optical coupler outputting a filtered optical signal; and
    at least one electrically tunable optical resonator, formed on said gallium arsenide substrate and connected to at least one of said at least one multiport optical coupler.

2. An optical filter according to claim 1 and wherein:
    said at least one multiport optical coupler, has at least first, second, third and fourth connection ports, said first connection port receiving an optical signal, said second connection port outputting a filtered optical signal; and
    said at least one tunable optical resonator is connected across said third and fourth connection ports.

3. An optical filter according to claim 1 and wherein:
    said at least one multiport optical coupler comprises at least first and second optical couplers, each having at least first, second and third connection ports;
    said first connection port of said first optical coupler receives an optical signal,
    said second and third connection ports of said first optical coupler are coupled to said at least one tunable optical resonator,
    said first and second connection ports of said second optical coupler are coupled to said at least one tunable optical resonator, and
    said third connection port of said second optical coupler outputs a filtered optical signal.

4. An optical filter according to claim 1 and wherein said at least one tunable optical resonator is operative to select an optical signal with a specific wavelength.

5. An optical filter according to claim 1 and wherein said at least one tunable optical resonator is operative to enable the polarization of said filtered optical output signal to be selected.

6. An optical filter according to claim 1 and wherein said tunable optical resonator is tuned by altering the phase of an optical signal traversing through it by means of a phase modulator.

7. An optical filter according to claim 1 and wherein said filtered optical output is converted to an electronic signal by means of a photodetector.

8. An active wavelength division multiplexing system including an optical filter according to claim 1, said filter being operative to select a desired wavelength of an optical signal.

9. An integrated optical filter according to claim 1 and comprising:
    a gallium arsenide wafer on which are defined a first waveguide and a second waveguide having a resonator loop disposed therebetween; and
    a first gate located above a second of the resonator loop and second and third gates located between said resonator and said first waveguide and said second waveguide respectively, said first gate and said resonant loop operating as a phase modulator for tuning a passband of said filter, said second and third gates being operative to change the coupling between the first waveguide and the resonator loop and between the resonator loop and the second waveguide as a function of voltage applied thereto, thereby enabling filter finesse to be changed dynamically by control signals applied to said second and third gates.

10. An optical filter with variable finesse comprising:
    an optical element, formed on a gallium arsenide substrate and having variable finesse, receiving an optical signal and providing a filtered output; and
    an electrically tunable finesse controller operative to select the finesse of said optical element.

11. An optical filter with variable finesse according to claim 10 and wherein said optical element with variable finesse comprises an optical coupler with variable power splitting ratio between its connection ports.

12. An optical filter with variable finesse according to claim 10 and comprising:
    at least one multiport optical coupler with variable power splitting ratio, one connection port of said at least one multiport optical coupler receiving an input optical signal, and another connection port of said at least one multiport optical coupler outputting a filtered optical signal; and
    at least one tunable optical resonator connected to at least one of said at least one multiport optical coupler.

13. An optical filter with variable finesse according to claim 12 and wherein:
    said at least one multiport optical coupler with variable power splitting ratio, has at least first, second, third and fourth connection ports, said first connection port receiving an optical signal, said second connection port outputting a filtered optical signal; and
    said at least one tunable optical resonator is connected across said third and fourth connection ports.

14. An optical filter with variable finesse according to claim 12 and wherein:
    said at least one multiport optical coupler with variable power splitting ratio comprises at least first and second optical couplers, at least one of which has variable power splitting ratio, and each having at least first, second and third connection ports;

said first connection port of said first optical coupler receives an optical signal, said second and third connection ports of said first optical coupler are coupled to said at least one tunable optical resonator, said first and second connection ports of said second optical coupler are coupled to said at least one tunable optical resonator, and said third connection port of said second optical coupler outputs a filtered optical signal.

15. An optical filter with variable finesse according to claim 12 and wherein said at least one tunable optical resonator is operative to select an optical signal with a specific wavelength thereby providing tunability to both the wavelength and finesse of said optical filter.

16. An optical filter according to claim 12 and wherein said at least one tunable optical resonator is operative to enable the polarization of said filtered optical output signal to be selected.

17. An optical filter according to claim 12 and wherein said tunable optical resonator is tuned by altering the phase of an optical signal traversing through it by means of a phase modulator.

18. An optical filter according to claim 10 and wherein said filtered optical output is converted to an electronic signal by means of a photodetector.

19. An active wavelength division multiplexing system including an optical filter according to claim 10, said filter being operative to select a desired wavelength of an optical signal.

20. An optical filter according to claim 10 and comprising:
a gallium arsenide wafer on which are defined a first waveguide and a second waveguide having a resonator loop disposed therebetween; and
a first gate located above a second of the resonator loop and second and third gates located between said resonator and said first waveguide and said second waveguide respectively, said first gate and said resonant loop operating as a phase modulator for tuning a passband of said filter, said second and third gates being operative to change the coupling between the first waveguide and the resonator loop and between the resonator loop and the second waveguide as a function of voltage applied thereto, thereby enabling filter finesse to be changed dynamically by control signals applied to said second and third gates.

21. An integrated optical filter comprising:
at least one multiport optical coupler, one connection port of said at least one multiport optical coupler receiving an input optical signal, and another connection port of said at least one multiport optical coupler outputting a filtered optical signal; and
at least one electrically tunable optical resonator connected to at least one of said multiport optical couplers; and
wherein at least one of said one multiport optical coupler and said at least one optical resonator are formed on a gallium arsenide substrate.

22. An integrated optical filter according to claim 21, and wherein:
said at least one multiport optical coupler has at least first, second, third and fourth connection ports, said first connection port receiving an optical signal, said second connection port outputting a filtered optical signal; and said at least one optical resonator is connected across said third and fourth connection ports.

23. An integrated optical filter according to claim 21 and wherein:
said at least one multiport optical coupler comprises at least first and second optical couplers, each having at least first, second and third connection ports;
said first connection port of said first optical coupler receives an optical signal,
said second and third connection ports of said first optical coupler are coupled to said at least one optical resonator,
said first and second connection ports of said second optical coupler are coupled to said at least one optical resonator, and
said third connection port of said second optical coupler outputs a filtered optical signal.

24. An integrated optical filter according to claim 21 and wherein at least one of said at least one multiport optical coupler and said at least one optical resonator includes a discrete non-integrated optical component.

25. An optical filter according to claim 21 and wherein said tunable optical resonator is tuned by altering the phase of an optical signal traversing, through it by means of a phase modulator.

26. An optical filter according to claim 21 and wherein said filtered optical output is converted to an electronic signal by means of a photodetector.

27. An active wavelength division multiplexing system including an optical filter according to claim 21, said filter being operative to select a desired wavelength of an optical signal.

28. An optical filter according to claim 21 and comprising:
a gallium arsenide wafer on which are defined a first waveguide and a second waveguide having a resonator loop disposed therebetween; and
a first gate located above a second of the resonator loop and second and third gates located between said resonator and said first waveguide and said second waveguide respectively, said first gate and said resonant loop operating as a phase modulator for tuning a passband of said filter; said second and third gates being operative to change the coupling between the first waveguide and the resonator loop and between the resonator loop and the second waveguide as a function of voltage applied thereto, thereby enabling filter finesse to be changed dynamically by control signals applied to said second and third gates.

29. An optical filter comprising:
at least three optical couplers formed on a gallium arsenide substrate, each having at least three connection ports; and
at least two optical resonators formed on said gallium arsenide substrate, at least one of which is electrically tunable, each of said at least two optical resonators being connected between two of said at least three optical couplers; and wherein
a first connection port of a first one of said at least three optical couplers receives an input optical signal, and
a last connection port of a last one of said at least three optical couplers outputs a filtered optical signal.

30. An optical filter according to claim 29 and comprising:
at least first, second and third optical couplers each having at least first, second and third connection ports; and
at least first and second optical resonators, at least one of which is tunable, each of said at least first and second optical resonators being connected between two of said at least first, second and third optical couplers; and wherein said first connection port of said first optical coupler receives an input optical signal, said second and third connection ports of said first optical coupler are coupled to the first of said at least first and second optical resonators, said first and second connection ports of said second optical coupler are coupled to the first of said at least first and second optical resonators, said third connection port and a fourth connection port of said second optical coupler are coupled to the second of said at least first and second optical resonators, said first and second connection ports of said third optical coupler are coupled to the second of said at least first and second optical resonators, and said third connection port of said third optical coupler outputs a filtered optical signal.

31. An optical filter according to claim 29 and wherein said optical resonators comprise loops of optical transmission medium differing in length from each other by predetermined amounts.

32. An optical filter according to claim 31 and wherein said difference in length of said loops of optical transmission medium is controlled by means of a piezoelectric transducer operative to stabilize the resonator length.

33. An optical filter according to claim 29 and wherein said at least one optical resonator is tuned by altering the phase of an optical signal traversing through it by means of a phase modulator.

34. An optical filter according to claim 29 and wherein said filtered optical output is converted to an electronic signal by means of a photodetector.

35. An active wavelength division multiplexing system including an optical filter according to claim 29, said filter being operative to select a desired wavelength of an optical signal.

36. An optical filter according to claim 29 and comprising:
  a gallium arsenide wafer on which are defined a first waveguide and a second waveguide having a resonator loop disposed therebetween; and
  a first gate located above a second of the resonator loop and second and third gates located between said resonator and said first waveguide and said second waveguide respectively, said first gate and said resonant loop operating as a phase modulator for tuning a passband of said filter, said second and third gates being operative to change the coupling between the first waveguide and the resonator loop and between the resonator loop and the second waveguide as a function of voltage applied thereto, thereby enabling filter finesse to be changed dynamically by control signals applied to said second and third gates.

37. An integrated optical filter comprising:
  at least three optical couplers, at least one of which is formed on a gallium arsenide substrate, each of said at least three optical couplers having at least three connection ports; and
  at least two optical resonators at least one of which is formed on a gallium arsenide substrate, at least one of which is electrically tunable, each of said at least two optical resonators being connected between two of said at least three optical couplers; and wherein
  a first connection port of a first one of said at least three optical couplers receives an input optical signal, and
  a last connection port of a last one of said at least three optical couplers outputs a filtered optical signal.

38. An integrated optical filter according to claim 37 and comprising:
  at least first, second and third optical couplers, at least one of which is formed on an integrated optics substrate, each of said at least first, second and third optical couplers having at least first, second and third connection ports; and
  at least first and second optical resonators, at least one of which is formed on an integrated optics substrate, each of said at least first and second optical resonators being connected between two of said at least first, second and third optical couplers; and wherein:
  said first connection port of said first optical coupler receives an input optical signal,
  said second and third connection ports of said first optical coupler are coupled to first of said at least first and second optical resonators,
  said first and second connection ports of said second optical coupler are coupled to first of said at least first and second optical resonators,
  said third connection port and a fourth connection port of said second optical coupler are coupled to second of said at least first and second optical resonators,
  said first and second connection ports of said third optical coupler are coupled to second of said at least first and second optical resonators, and
  said third connection port of said third optical coupler outputs a filtered optical signal.

39. An optical filter according to claim 37 and wherein said at least one optical resonator is tuned by altering the phase of an optical signal traversing through it by means of a phase modulator.

40. An optical filter according to claim 37 and wherein said filtered optical output is converted to an electronic signal by means of a photodetector.

41. An active wavelength division multiplexing system including an optical filter according to claim 37, said filter being operative to select a desired wavelength of an optical signal.

42. An integrated optical filter according to claim 37 and comprising:
  a gallium arsenide wafer on which are defined a first waveguide and a second waveguide having a resonator loop disposed therebetween; and
  a first gate located above a second of the resonator loop and second and third gates located between said resonator and said first waveguide and said second waveguide respectively, said first gate and said resonant loop operating as a phase modulator for tuning a passband of said filter, said second and third gates being operative to change the coupling between first waveguide and the resonator loop and between the resonator loop and the second waveguide as a function of voltage applied thereto, thereby enabling filter finesse to be changed dynamically by control signals applied to said second and third gates.

* * * * *